(12) United States Patent  (10) Patent No.: US 8,466,953 B2
Levola  (45) Date of Patent: Jun. 18, 2013

(54) STEREOSCOPIC EXIT PUPIL EXPANDER DISPLAY

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 508 days.

(21) Appl. No.: 12/227,728

(22) PCT Filed: Jun. 2, 2006

(86) PCT No.: PCT/IB2006/001472
§ 371 (c)(1),
(2), (4) Date: Mar. 10, 2010

(87) PCT Pub. No.: WO2007/141589
PCT Pub. Date: Dec. 13, 2007

(65) Prior Publication Data
US 2010/0231693 A1    Sep. 16, 2010

(51) Int. Cl.
*H04N 13/04* (2006.01)

(52) U.S. Cl.
USPC ............. 348/51; 348/59; 359/462; 359/463

(58) Field of Classification Search
USPC ................. 348/59, 51; 359/463, 462
See application file for complete search history.

(56) References Cited

U.S. PATENT DOCUMENTS

| | | | |
|---|---|---|---|
| 5,682,255 A | 10/1997 | Friesem et al. | |
| 6,117,923 A | 9/2000 | Amatai et al. | 523/440 |
| 6,805,490 B2 | 10/2004 | Levola | 358/67 |
| 7,206,107 B2 | 4/2007 | Levola | 359/34 |
| 7,609,445 B2 * | 10/2009 | Hamagishi | 359/463 |
| 2004/0062502 A1 | 4/2004 | Levola | |
| 2004/0212776 A1 | 10/2004 | Spitzer et al. | |
| 2004/0233534 A1 | 11/2004 | Nakanishi et al. | |
| 2006/0132914 A1 * | 6/2006 | Weiss et al. | 359/462 |

FOREIGN PATENT DOCUMENTS

| | | |
|---|---|---|
| EP | 1 215 522 A2 | 6/2002 |
| JP | 57014806 A | 1/1982 |
| JP | 8-036147 | 2/1996 |
| JP | 2003-215318 A | 7/2003 |
| JP | 2005-173091 A | 6/2005 |
| JP | 2005-266023 A | 9/2005 |
| JP | 2006-501499 A | 1/2006 |
| WO | 99/52002 | 10/1999 |
| WO | 03/032017 A2 | 4/2003 |
| WO | 2004/055556 A1 | 7/2004 |
| WO | 2004/109349 A2 | 12/2004 |

(Continued)

OTHER PUBLICATIONS

Tapani Levola, Diffractive Optics for Virtual Reality Displays, J. of SID, 14/5, 2006 p. 467-475.

(Continued)

*Primary Examiner* — Kyung H Shin
(74) *Attorney, Agent, or Firm* — Alston & Bird LLP

(57) ABSTRACT

The specification and drawings present a new apparatus and method for providing a stereoscopic display in electronic devices with a diffractive exit pupil expander using sequentially switching between right and left images of one display (e.g., microdisplay). An optical delivery system can provide a sequential left and right image of the display and the illumination is then switched for left and right accordingly using exit pupil expander (EPE) with asymmetric, e.g., highly slanted, in-coupling gratings, sending light practically to only one direction (e.g., one area of the EPE substrate).

34 Claims, 8 Drawing Sheets

FOREIGN PATENT DOCUMENTS

| | | | |
|---|---|---|---|
| WO | WO 2006/008734 | A2 | 1/2006 |
| WO | WO 2006/008734 | A3 | 3/2006 |
| WO | WO 2007/052265 | A2 | 5/2007 |

OTHER PUBLICATIONS

Tapani Levola, 7.1: Invited Paper: Novel Diffractive Optical Components for Near to Eye Displays, J. of SID, 2006, ISSN0006-0966X/06/3701-0000.

Tapani Levola, 22.1: Invited Paper: Diffractive Optics for Virtual Reality Displays, EuroDisplay 2005, p. 538-541.

M. Breidne, et. al., Blazed holographic gratings, Optica Acta, 26/11, 1979, p. 1427-1441.

J. Michael Miller, et. al., Design and fabrication of binary slanted surface-relief gratings for a planar optical interconnection, Applied Optics, 36/23, Aug. 10, 1997, p. 5717-5727.

Y. Amitai, et. al., Visor-display design based on planar holographic optics, Applied Optics, 34/8, Mar. 10, 1995, p. 1352-1356.

E.Gardner, et al., 52.3: An Improved Polarizing Beamsplitter LCOS Projection Display Based on Wire-Grid Polarizers, SID 01 Digest, 2001 SID, p. 1282-1285.

B. Wang, et al., Compact slanted grating couplers, Optics Express, 12/15, Jul. 26, 2004, p. 3313-3316.

Kahn Internationa™, Private Line Report on Projection Display, vol. 7, No. 10, Apr. 20, 2001, Focus: Doing it with stripes, Ed. F. Kahn, Ph.D.

European Search Report for Application No. 06765457.4 dated Jun. 19, 2012.

* cited by examiner

STEREOSCOPIC EXIT PUPIL EXPANDER DISPLAY

PRIORITY AND CROSS-REFERENCE TO RELATED APPLICATION

This application is a US National Stage Application from PCT International Application No. PCT/IB2006/001472 filed on Jun. 2, 2006 (International Publication No. WO 2007/141589). The PCT International Application No. PCT/IB2006/001472 discloses subject matter which is also disclosed and which may be claimed in co-pending, co-owned application PCT/IB2006/001456) filed on even date herewith.

TECHNICAL FIELD

The present invention relates generally to a display device and, more specifically, to a stereoscopic display which uses a plurality of diffractive elements for expanding the exit pupil of a display for viewing.

BACKGROUND ART

While it is a common practice to use a low-resolution liquid-crystal display (LCD) panel to display network information and text messages in a mobile device, it is preferred to use a high-resolution display to browse rich information content of text and images. A microdisplay-based system can provide full color pixels at 50-100 lines per mm. Such high-resolution is generally suitable for a virtual display. A virtual display typically consists of a microdisplay to provide an image and an optical arrangement for manipulating light emerging from the image in such a way that it is perceived as large as a direct view display panel. A virtual display can be monocular or binocular.

The size of the beam of light emerging from imaging optics toward the eye is called exit pupil. In a Near-to-Eye Display (NED), the exit pupil is typically of less than 10 mm in diameter. Further enlarging the exit pupil makes using the virtual display significantly easier, because the device can be put at a distance from the eye.

Normally, in order to provide a stereoscopic viewing using exit pupil beam expanders with plurality of diffractive elements, images of two microdisplays can be utilized.

DISCLOSURE OF THE INVENTION

According to a first aspect of the invention, an apparatus, comprises: a substrate of optical material having a first surface and a second surface, the substrate comprising a first area and a second area substantially adjacent to each other along a line; two diffractive elements disposed on the first or the second surface and configured to receive sequentially two input optical beams comprising an optical image of a display such that one of the two input optical beams is received by one of the two diffractive elements and another of the two input optical beams is received by another of the two diffractive elements, wherein one of the two diffractive elements is disposed on the first area and another of the two diffractive elements is disposed on the second area, respectively; two further diffractive elements disposed on the first or the second surface, wherein one of the two further diffractive elements is disposed on the first area and another of the two further diffractive elements is disposed on the second area, respectively; and an optical delivery system, configured to sequentially switch the two input optical beams comprising the optical image of the display between the two diffractive elements, wherein at least part of each of the two sequentially switched input optical beams at any time is diffracted only in one of the two diffractive elements to provide a diffracted optical beam in the same area with the one of the two diffractive elements substantially within the first and second surfaces, and at least part of the diffracted optical beam in the first or the second area is further coupled out of the substrate by diffraction in one of the two further diffractive elements for providing two sequentially switched and substantially identical output optical beams, each comprising the optical image of the display with an expanded exit pupil in one or two dimensions.

According further to the first aspect of the invention, the two sequentially switched and substantially identical output optical beams may be for providing a stereoscopic image of the display.

According further to the first aspect of the invention, the two diffractive elements may be substantially next to each other and adjacent to the line.

Still further according to the first aspect of the invention, the optical delivery system may comprise two optical sources configured to provide two optical beams in substantially different directions for sequentially switching the two input optical beams. Further, the two optical sources may be configured to turn on and off in a sequential manner with a predetermined period. Further still, the optical delivery system may comprise a wire grid polarizer configured as a beamsplitter to re-direct the two optical beams for the sequentially switching the two input optical beams between the two diffractive elements and the display is a liquid crystal on silicon display.

According further to the first aspect of the invention, the optical delivery system may comprise a shutter configured to sequentially switch the two input optical beams between the two diffractive elements with a predetermined period.

According still further to the first aspect of the invention, the substrate may be a one-piece substrate.

According further still to the first aspect of the invention, the substrate may be configured to have in a vicinity of the line an absorbing material on a surface of the substrate opposite to a substrate surface with the disposed two diffractive elements.

According yet further still to the first aspect of the invention, the substrate may be a split substrate such that the first area and second areas are physically separated. Further, an absorbing material may be deposited on an end of at least one of the first and the second parts in an area of their physical separation along the line.

Yet still further according to the first aspect of the invention, locations of the two diffractive elements or the two further diffractive elements may be symmetrical relative to the line.

Still yet further according to the first aspect of the invention, the two diffractive elements may have an asymmetric groove shape such that the input optical beam diffracted by each of the two diffractive elements is substantially coupled only to an area, out of the first and the second areas, in which the each of the two diffractive elements is disposed.

Still further still according to the first aspect of the invention, the two diffractive elements may have an asymmetric groove shape and may be slanted gratings with a slanting angle of more than 20 degrees.

According further still to the first aspect of the invention, the two diffractive elements may be asymmetric such that their groove shapes are mirror images of each other with respect to the line which separates the first and the second areas.

According yet further still to the first aspect of the invention, the two diffractive elements and the two further diffractive elements may be disposed on one surface of the substrate.

According still yet further to the first aspect of the invention, each area, the first and the second area of the substrate, may comprise an intermediate diffractive element such that the at least part of the optical beam diffracted in the first or the second diffractive element is first coupled to the intermediate diffractive element, which then couples, using a further diffraction in the intermediate diffractive element, the at least part of the diffracted optical beam to one of the two further diffractive elements disposed on the each area, to provide a two-dimensional exit pupil expansion of one of the two input optical beams in the each area.

According to a second aspect of the invention, a method, comprises: receiving two sequentially switched input optical beams by two diffractive elements such that one of the two input optical beams is received by one of the two diffractive elements and another of the two input optical beams is received by another of the two diffractive elements, the two diffractive elements being disposed on a first or a second surface of a substrate made of optical material, the substrate comprising a first area and a second area substantially adjacent to each other along a line, and wherein the one of the two diffractive elements is disposed on the first part and the another of the two diffractive elements is disposed on the second part, respectively, wherein the two sequentially switched input optical beams comprise an optical image of a display and are provided by an optical delivery system; diffracting at least part of each of the two sequentially switched input optical beams at any time only in one of the two diffractive elements to provide a diffracted optical beam in the same area with the one of the two diffractive elements substantially within the first and second surfaces; and coupling at least part of the diffracted optical beam in the first or the second area out of the substrate by diffraction in one of the two further diffractive elements for providing two sequentially switched and substantially identical output optical beams, each comprising the optical image of the display with an expanded exit pupil in one or two dimensions, wherein the two further diffractive elements are disposed on the first or the second surface, wherein one of the two further diffractive elements is disposed on the first area and another of the two further diffractive elements is disposed on the second area, respectively.

According further to the second aspect of the invention, the two sequentially switched and substantially identical output optical beams may be for providing a stereoscopic image of the display.

Further according to the second aspect of the invention, the two diffractive elements may be substantially next to each other and adjacent to the line.

Still further according to the second aspect of the invention, the optical delivery system may comprise two optical sources configured to provide two optical beams in substantially different directions for sequentially switching the two input optical beams.

According further to the second aspect of the invention, the optical delivery system may comprise a shutter configured to sequentially switch the two input optical beams between the two diffractive elements with a predetermined period.

According still further to the second aspect of the invention, the substrate may be a one-piece substrate.

According further still to the second aspect of the invention, the substrate may be a split substrate such that the first area and second areas are physically separated.

According yet further still to the second aspect of the invention, the two diffractive elements may have an asymmetric groove shape such that the input optical beam diffracted by each of the two diffractive elements is substantially coupled only to an area, out of the first and the second areas, in which the each of the two diffractive elements is disposed.

Yet still further according to the second aspect of the invention, the two diffractive elements may be asymmetric such that their groove shapes are mirror images of each other with respect to the line which separates the first and the second areas.

According to a third aspect of the invention, an electronic device, comprises:
  a data processing unit;
  an optical engine operatively connected to the data processing unit for receiving image data from the data processing unit;
  a display device operatively connected to the optical engine for forming an image based on the image data; and
  an exit pupil expander device, comprising:
    a substrate of optical material having a first surface and a second surface, the substrate comprising a first area and a second area substantially adjacent to each other along a line;
    two diffractive elements disposed on the first or the second surface and configured to receive sequentially two input optical beams comprising an optical image of a display such that one of the two input optical beams is received by one of the two diffractive elements and another of the two input optical beams is received by another of the two diffractive elements, wherein one of the two diffractive elements is disposed on the first area and another of the two diffractive elements is disposed on the second area, respectively;
    two further diffractive elements disposed on the first or the second surface, wherein one of the two further diffractive elements is disposed on the first area and another of the two further diffractive elements is disposed on the second area, respectively; and
    an optical delivery system, configured to sequentially switch the two input optical beams comprising the optical image of the display between the two diffractive elements, wherein
      at least part of each of the two sequentially switched input optical beams at any time is diffracted only in one of the two diffractive elements to provide a diffracted optical beam in the same area with the one of the two diffractive elements substantially within the first and second surfaces, and
      at least part of the diffracted optical beam in the first or the second area is further coupled out of the substrate by diffraction in one of the two further diffractive elements for providing two sequentially switched and substantially identical output optical beams, each comprising the optical image of the display with an expanded exit pupil in one or two dimensions.

Further according to the third aspect of the invention, the two sequentially switched and substantially identical output optical beams may be for providing a stereoscopic image of the display.

Still further according to the third aspect of the invention, the two diffractive elements may be substantially next to each other and adjacent to the line.

According further to the third aspect of the invention, the optical delivery system may comprise two optical sources configured to provide two optical beams in substantially different directions for sequentially switching the two input optical beams.

According still further to the third aspect of the invention, the substrate may be a one-piece substrate.

According yet further still to the third aspect of the invention, the substrate may be a split substrate such that the first area and second areas are physically separated.

According to a fourth aspect of the invention, an apparatus, comprises:

means for optical delivery, for providing two sequentially switched input optical beams comprising an optical image of a display;

two means for diffraction, for receiving two sequentially switched input optical beams by two means for diffraction such that one of the two input optical beams is received by one of the two means for diffraction and another of the two input optical beams is received by another of the two means for diffraction, the two means for diffraction being disposed on a first or a second surface of a substrate made of optical material, the substrate comprising a first area and a second area substantially adjacent to each other along a line, and wherein the one of the two means for diffraction is disposed on the first part and the another of the two diffractive elements is disposed on the second part, respectively, wherein the two sequentially switched input optical beams comprise an optical image of a display and are provided by the means for optical delivery, and for diffracting at least part of each of the two sequentially switched input optical beams at any time only in one of the two means for diffraction to provide a diffracted optical beam in the same area with the one of the two means for diffraction substantially within the first and second surfaces; and two further means for diffraction, for coupling at least part of the diffracted optical beam in the first or the second area out of the substrate by diffraction in one of the two further means for diffraction for providing two sequentially switched and substantially identical output optical beams, left and right, each comprising the optical image of the display with an expanded exit pupil in one or two dimensions, wherein the two further means for diffraction are disposed on the first or the second surface, wherein one of the two further means for diffraction is disposed on the first area and another of the two further means for diffraction is disposed on the second area, respectively.

According further to the fourth aspect of the invention, the apparatus may be a stereoscopic optical device and the two sequentially switched and substantially identical output optical beams may be for providing a stereoscopic image of the display.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

Figure 1A:
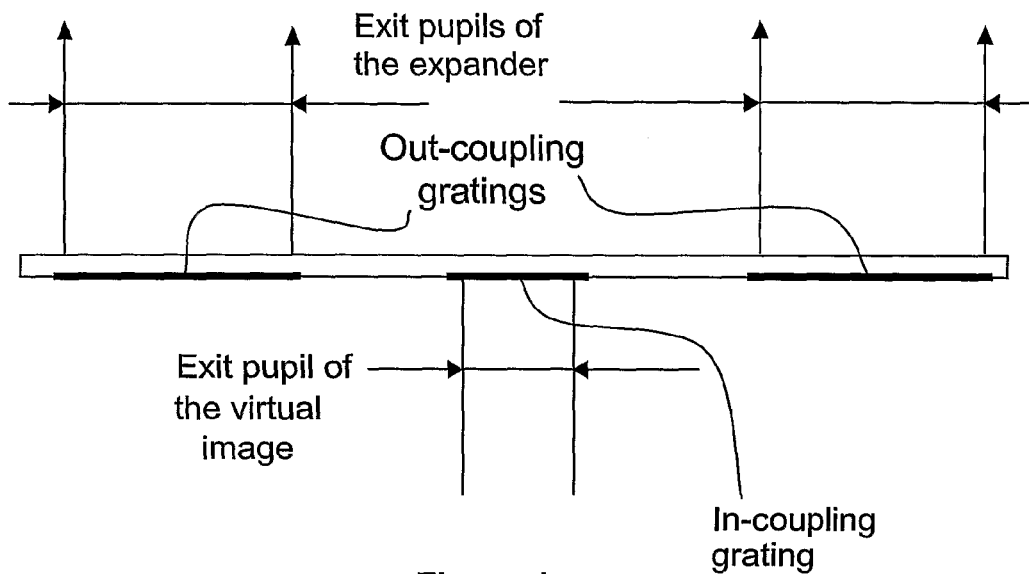
FIGS. 1a through 1d are schematic representations of a one-dimensional diffractive exit pupil expander (EPE) as a part of a virtual display (a cross sectional view is shown in FIG. 1a and a top view of the EPE which corresponds to a front of display is shown in FIG. 1b), and schematic representations (cross-sectional views) of an in-coupling grating (e.g., using slanted asymmetric grating) shown in FIG. 1c and an out-coupling grating, shown in FIG. 1d.

A new method and apparatus are presented for providing a stereoscopic display in electronic devices with a diffractive exit pupil expander using sequentially switching between right and left images of one display (e.g., microdisplay). According to an embodiment of the present invention, an optical delivery system can provide a sequential left and right image of the display and the illumination is then switched for left and right accordingly using exit pupil expander (EPE) with asymmetric, e.g., highly slanted, in-coupling gratings, sending light practically to only one direction (e.g., one area of the EPE substrate). The embodiments of the present invention can be applied to a broad optical spectral range of optical beams but most importantly to a visible part of the optical spectrum where the optical beams are called light beams.

According to embodiments of the present invention, the stereoscopic optical device (e.g., the device can be a part of a virtual reality display) can comprise a substrate made of optical material having a first surface and an opposing second surface, wherein the substrate comprising a first area and a second area substantially adjacent to each other along a line.

Moreover, two diffractive elements (or in-coupling diffraction gratings) can be disposed on the first or the second surface and each of the diffractive elements can be configured to receive one of two input optical beams comprising an optical image of a display, wherein one of the two diffractive elements is disposed on the first area and another of the two diffractive elements is disposed on the second area, respectively, and said two diffractive elements can be substantially next to each other and adjacent to said line.

Thus, at least part of each of the two sequentially switched input optical beams at any time is diffracted only in one of the two diffractive elements to provide a diffracted optical beam in the same area comprising said one of the two diffractive elements substantially within the first and second surfaces due to a total internal reflection.

According to an embodiment of the present invention, the optical delivery system can be configured to sequentially switch the two input optical beams comprising the optical image of the display between the two diffractive elements.

Then the two areas can expand the exit pupil of the input optical beams independently in one or two dimensions to provide substantially identical two output optical beams, left and right, each comprising the optical image of the display with an expanded exit pupil in one or two dimensions, thus providing a stereoscopic image of the display to a user observing the left and right output optical beams, wherein the switching speed between left and right images is fast enough to "fuse" a stereoscopic image of the display in a human brain as known in the art.

In case of a simple one-dimensional exit pupil expansion, two further diffractive elements (or out-coupling diffraction gratings) can be disposed on the first or the second surface (e.g., two further diffractive elements may have parallel periodic lines and/or be symmetric relative to said line), wherein one of the two further diffractive elements is disposed on the first area and another of said two further diffractive elements is disposed on the second area, respectively, thus at least part of the diffracted optical beam in each of the first and the second areas of the substrate is further coupled out of the substrate by diffraction (as known in the art) in each of the two further diffractive elements, thus providing substantially identical two output optical beams alternating sequentially in time. It is noted that the two diffractive elements and the two further diffractive elements can be disposed on one surface or on different surfaces of said substrate.

In case of a two-dimensional exit pupil expansion, each of the first and the second areas of the substrate can comprise an intermediate diffractive element such that the at least part of the optical beam diffracted in the first or the second diffractive element is first coupled to the intermediate diffractive element, which then couples, using a further diffraction in the intermediate diffractive element, the at least part of the diffracted optical beam to one of the two further diffractive elements disposed in each area, thus providing the two-dimensional exit pupil expansion of one of the two input optical beams by the each of the first and the second areas. The intermediate diffractive element can have an odd number of first order diffractions or an even number of further first order reflections as known in the art and, e.g., described by T. Levola in "Diffractive Optics for Virtual Reality Displays", SID Eurodisplay 05, Edinburg (2005), SID 02 Digest, Paper 22.1.

According to further embodiments of the present invention, the optical delivery system can comprise two optical sources (e.g., light emitting diodes, typically providing a polarized light) configured to provide two optical beams in substantially different directions for sequentially switching the two input optical beams, wherein the two optical sources are configured to turn on and off in a sequential manner with a predetermined period. The optical delivery system can further comprise a beamsplitter, e.g., using a wire grid polarizer configured as a polarized beam-splitter to re-direct two optical beams for sequentially switching the two input optical beams between said two diffractive elements (see Examples in FIGS. 2a, 2b, 3a and 3b). Furthermore, the optical delivery system may comprise a shutter configured to sequentially switch the two input optical beams between said two diffractive elements with the predetermined period: a) in addition to turning on and off the light sources for improving separation of the left and right input optical beams or b) instead of the turning on and off the light sources thus prolonging the lifetime of the light sources by avoiding a large signal modulation regime of the optical sources. For example, a liquid crystal on silicon (LCOS) type microdisplay can be switched, e.g., with 480 frames/second speed which implies 160 frames/second full color speed and 80 frame/second stereoscopic speed.

According to a further embodiment of the present invention, the substrate used for the EPE can be implemented as one-piece substrate using, e.g., highly asymmetric slanted diffraction grating with a high efficiency coupling to a desired area (first or second) of the substrate by the corresponding input diffractive elements. The contrast can be further improved by providing an absorbing material on the opposite surface of the substrate (i.e., opposite to the surface with the disposed input diffractive elements). The width of this absorbing material should be optimized (e.g., to be approximately the same as the thickness of the substrate) in order to absorb only optical beams propagating in unwanted directions. In case of the one-piece flat substrate, the two diffractive elements adjacent to each other can be considered as one diffraction grating, e.g., with two highly asymmetric slanted areas of the grating.

According to another embodiment of the present invention, the substrate used for the EPE can be implemented as a split substrate, such that said first area and second areas are physically separated. In addition, this split substrate can be configured that the first and the second areas can rotate in a predetermined angle range relative to each other around said line which separates the first and the second areas to provide better viewing.

According to embodiments of the present invention, the two diffractive elements (or the in-coupling diffraction gratings) can be implemented using a variety of different types of diffraction gratings, e.g., planar diffraction gratings manufactured using lithographic methods or classically ruled (having different groove angles and profiles, such as binary, triangular, sinusoidal, etc.). The two diffractive elements (i.e., their grooves) can be symmetric or asymmetric relative to the line which divides (virtually or physically) the first and the second areas. The term "asymmetric" in regard to the grooves of the two in-coupling gratings can have two aspects: a) when periodic lines (or grooves) of the two gratings are not parallel, and b) when grooves of the two gratings have different slanted angles. Therefore, one possibility is to have non-parallel asymmetric periodic lines in the two in-coupling diffraction gratings, thus re-directing only wanted components in each part of the substrate to the corresponding out-coupling gratings. Another solution (which can be combined with periodic line asymmetry) is to use slanted gratings (e.g., using a slanting angle of at least more than 20 degrees and optimally between 35 and 50 degrees) for increasing the coupling efficiency and reducing an "optical crosstalk" between the first and the second parts (or left and right parts) of the split substrate. In other words, the asymmetric gratings (used as the two diffractive elements) can provide that the input optical beam diffracted by each of the two diffractive elements is substantially coupled only in a desired direction to the part in which said each of the two diffractive elements is disposed.

Furthermore, according to an embodiment of the present invention, in order to provide the effective coupling and minimize the "optical crosstalk" between the two parts of the split or one-piece substrate, the two slanted gratings can be asymmetric such that their slanting angles are equal but have opposite signs relative to the optical axis of the system creating the input optical beam, i.e., the groove shapes are mirror images of each other with respect to the line which separates the first and the second parts. Moreover, an absorbing material can be deposited on the first and/or the second part in an area of their physical separation along the line which separates the first and the second areas in the case of the split substrate.

Figure 1B:
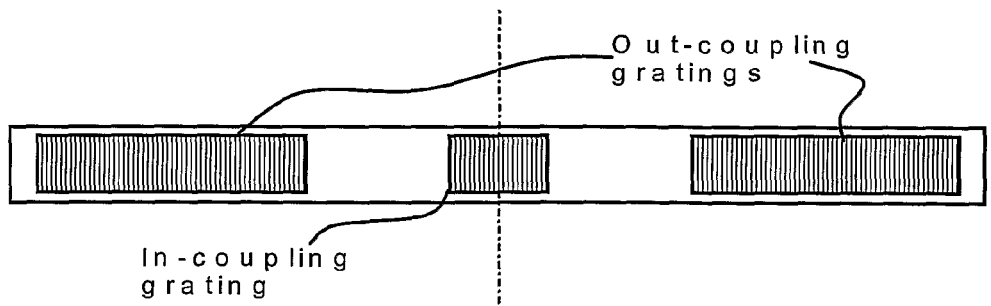
Figure 1C:
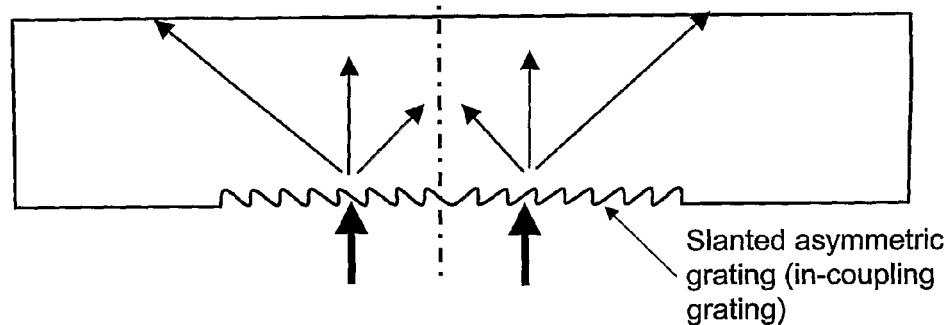
Figure 1D:
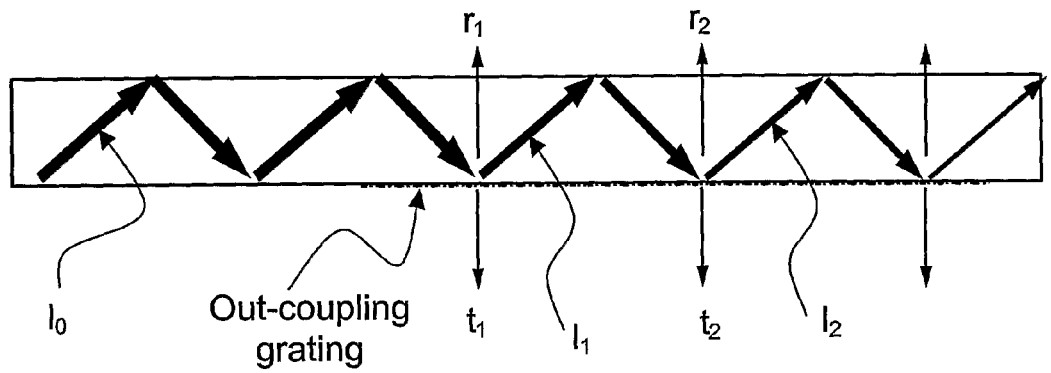

FIGS. 1a through 1d show schematic representations of a one-dimensional diffractive exit pupil expander (EPE) with a cross sectional view shown in FIG. 1a and a top view shown in FIG. 1b, thus providing two substantially identical images for the right and left eyes, and schematic representations (a top view of an EPE which corresponds to a front of display is shown in Figure) of an in-coupling grating (e.g., using a slanted asymmetric grating) shown in FIG. 1c and an out-coupling grating, shown in FIG. 1d. The light is coupled out from the out-coupling grating. The amount of out-coupling at each time the beam meets the grating depends on the grating properties. The system can be designed so that at least for one wavelength and incoming angle the output is uniform, i.e. $r_1=r_2=\ldots$, as shown in FIG. 1d, wherein $r_1, r_2, \ldots$ and $t_1, t_2, \ldots$ are reflected and transmitted optical beams out of the EPE, respectively, and I1, I2 ... are reflected optical beams inside the EPE by the total internal reflection. FIGS. 2-6 demonstrate different embodiments of the present invention for providing a stereoscopic image of the display (e.g., the microdisplay). The example of the EPE and its elements shown in FIGS. 1a-1d can be used for applying embodiments of the present invention. FIGS. 2-6 demonstrate different embodiments of the present invention.

Figure 2A:
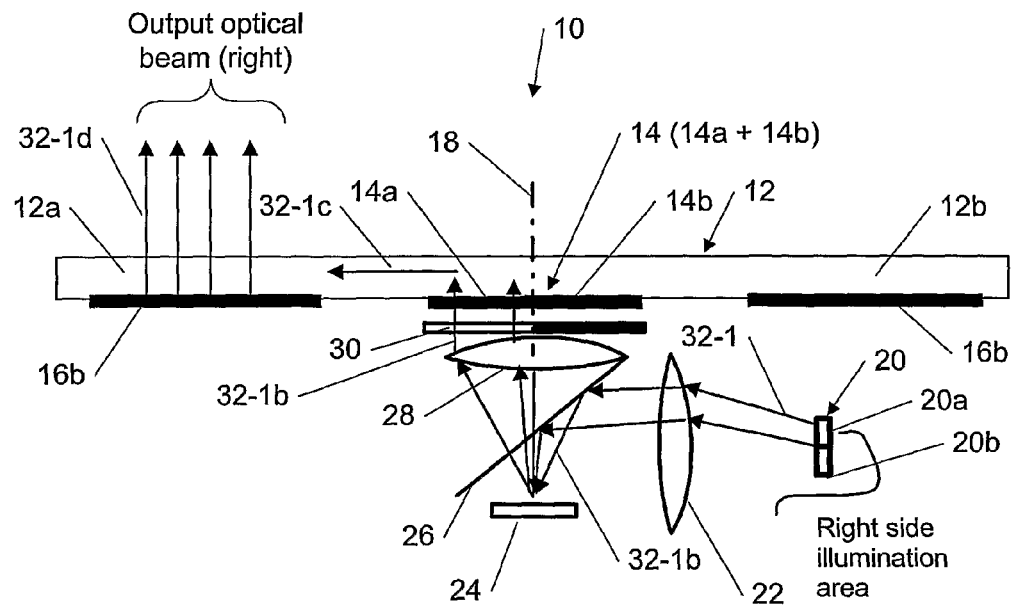
FIGS. 2a and 2b are schematic representations (cross sectional views) of a stereoscopic optical device (display) with a flat diffractive exit pupil expander using sequential switching between a right image (FIG. 2a) and a left image (FIG. 2b) of a microdisplay, according to an embodiment of the present invention.
Figure 2B:
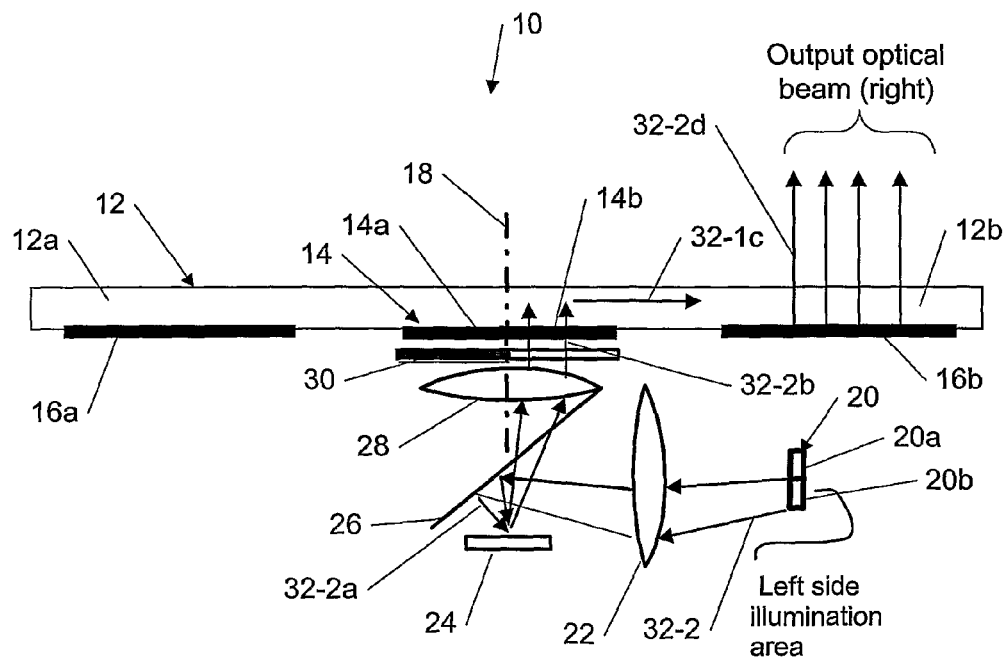

FIGS. 2a and 2b show examples among others of schematic representations (cross sectional views) of a stereoscopic optical device (display) 10 (or an EPE device) with a flat diffractive exit pupil expander 12 (e.g., a one-piece substrate) using sequential switching between a right image 32-1d (FIG. 2a) and a left image 32-2d (FIG. 2b) of a microdisplay 24, according to an embodiment of the present invention. The microdisplay 24 in this example can utilize, e.g., a liquid crystal on silicon (LCOS).

The EPE 12 is a solid substrate comprising two adjacent areas 12a and 12b that are adjacent to each other along a line 18 (here line 18 is an imaginary line). The area 12a comprises the in-coupling grating 14a and an out-coupling grating 16a and the area 12b comprises the in-coupling grating 14b and an out-coupling grating 16b, respectively. The adjacent gratings 14a and 14b can be highly asymmetric as further shown in an example of FIG. 4a.

According to an embodiment of the present invention, the optical delivery system can be configured to sequentially switch the two input optical beams comprising the optical image of the microdisplay 24 between the two diffractive elements 14a and 14b. The optical delivery system can comprise two optical sources (e.g., light emitting diodes) 20a and 20b which can be combined in a dual light source 20, configured to provide two optical beams 32-1 and 32-2 (typically polarized) in substantially different directions as shown in FIGS. 2a and 2b, respectively, for sequentially switching the two input optical beams 32-1b and 32-2b comprising images of the microdisplay 24 which are diffracted to the corresponding optical beams 32-1c and 32-2c by the in-coupling gratings 14a and 14b and further diffracted to the optical output beams (the right and the left images of the microdisplay 30) 32-1d and 32-2d, wherein the two optical sources 20a and 20b are configured to turn on and off in a sequential manner with the predetermined period as discussed above. Thus, a stereoscopic image of the microdisplay 30 is provided to a user observing the left and right output optical beams 32-1d and 32-2d sequentially switched, wherein the switching speed between left and right images is fast enough to "fuse" a stereoscopic image of the microdisplay in a human brain as known in the art.

The optical delivery system, e.g., for an LCOS microdisplay 24 can further comprise a wire grid polarizer 26 configured as a polarization beam-splitter to redirect two optical beams reflected for sequentially switching the two input optical beams between said two diffractive elements (see Examples in FIGS. 2a, 2b, 3a and 3b). In principle a traditional 50% beam splitter can be also utilized which will result in more than 75% optical power loss, therefore using the wire grid polarizer which minimizes the optical power loss to a minimum (typically less than 20%) is advantageous. The wire grid polarizer is known in the art and described, e.g., by S. Arnold, E. Gardner, D. Hansen and R. Perkins in "An improved polarizing beamsplitter LCOS Projection Display Based on Wire-Grid Polarizers", SID 01 Digest, Paper 52.3, page 1282-1285 (2001).

Furthermore, the optical delivery system may comprise a shutter 30 configured to sequentially switch the two input optical beams 32-1b and 32-2b between the two diffractive elements 14a and 14b with the predetermined period: a) in addition to turning on and off the light sources 20a and 20b for improving the separation of the left and right input optical beams 32-1b and 32-2b or b) instead of turning on and off the light sources 20a and 20b thus simplifying the illumination optics.

Figure 3A:
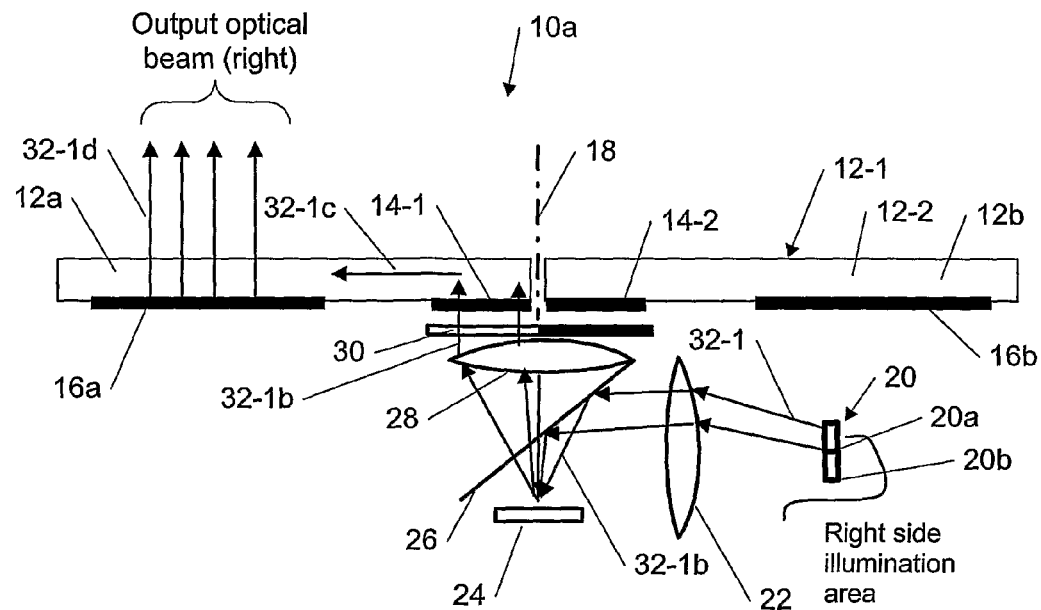
FIGS. 3a and 3b are schematic representations (cross sectional views) of a stereoscopic optical device (display) with a split diffractive exit pupil expander using sequential switching between a right eye image (FIG. 3a) and a left eye image (FIG. 3b) of a microdisplay, according to an embodiment of the present invention.
Figure 3B:
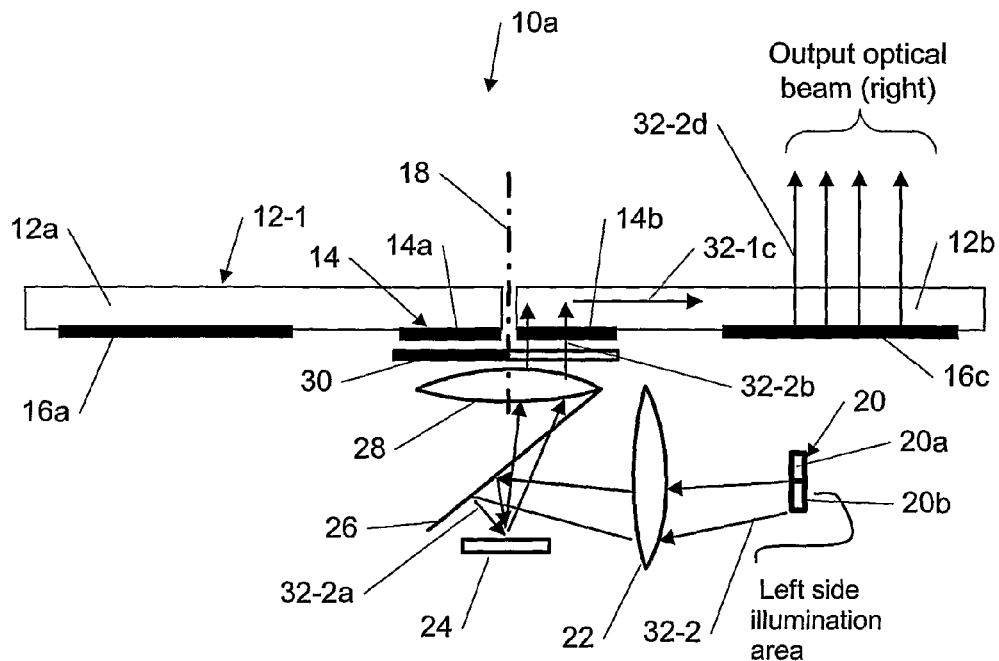

FIGS. 3a and 3b show examples among others of schematic representations (cross sectional views) of a stereoscopic optical device (display) 10a with a split diffractive exit pupil expander (EPE) 12-1 using sequential switching between the right image 32-1d (FIG. 3a) and the left image 32-2d (FIG. 3b) of the LCOS microdisplay 24, according to an embodiment of the present invention. The only difference in FIGS. 3a and 3b, compared to FIGS. 2a and 2b, is using the split EPE comprising physically separated areas 12a and 12b and physically separated input diffraction gratings 14a and 14b, respectively. Using split input diffraction gratings 14a and 14b can provide better optical isolation between the areas 12a and 12b and better separation of the images 32-1d and 32-2d. In addition, this split substrate 12-1 can be configured that the first and the second areas 12a and 12b can rotate relative to each around the line 18 in a predetermined angle range (in a direction 15 as shown in FIGS. 3a and 3b) to provide better viewing if required.

Figure 4A:
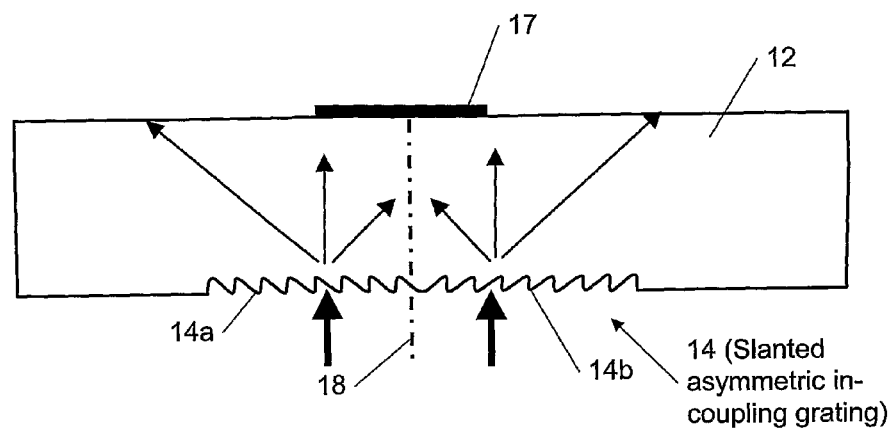
FIGS. 4a and 4b are schematic representations (cross sectional views) of flat slanted asymmetric gratings (FIG. 4a) and a split in-coupling grating (FIG. 4b) which can be used in an exit pupil expander, according to an embodiment of the present invention.

FIG. 4a shows one example among others of a schematic representation of slanted asymmetric gratings 14a and 14b (which can be considered as one diffraction grating 14) used in the exit pupil expander 12 (with one-piece substrate) of a stereoscopic optical display 10 shown in FIGS. 2a and 2b, according to an embodiment of the present invention. The optical contrast can be further improved by providing an absorbing material (e.g., an absorbing coating) 17 on a surface of the substrate 12 opposite to the substrate surface with the disposed input diffraction gratings 14a and 14b in a vicinity of the line 18 (as shown in FIG. 4a). If the width of the absorbing area is optimized to be small enough compared to the total width of the gratings 14a and 14b as shown in FIG. 4a, only the unwanted optical beams will be absorbed. These unwanted beams are the optical beams which are transmitted by the gratings 14a and 14b without diffracting and those diffracted beams that propagate in unwanted directions.

Figure 4B:
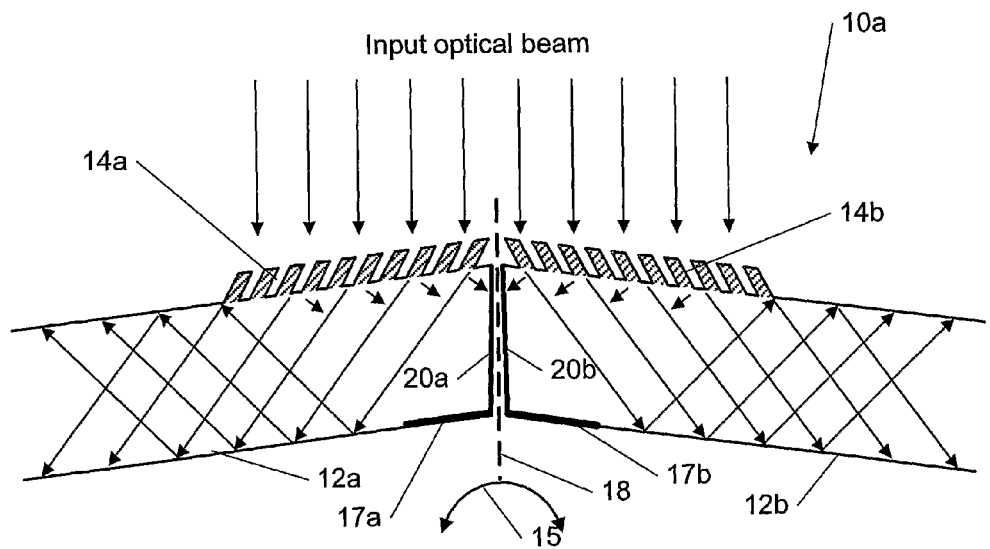

FIG. 4b shows one further example among others of a schematic representation of a split exit pupil expander 12-1 of a stereoscopic optical display 10a shown in FIGS. 3a and 3b using split slanted asymmetric in-coupling gratings 14a and 14b (diffractions grooves of gratings 14a and 14b face different directions relative to the optical axis of the system providing input optical beams), according to an embodiment of the present invention. According to a further embodiment, the ends of the diffraction gratings 14a and 14b can be coated with an absorbing material 20a and 20b along the line 18 to further optically isolate the areas 12a and 12b. Similarly to FIG. 4a, the absorbing materials 17a and 17b can be used in addition or instead of absorbing material 20a and 20b to further improve the optical contrast.

Figure 5A:
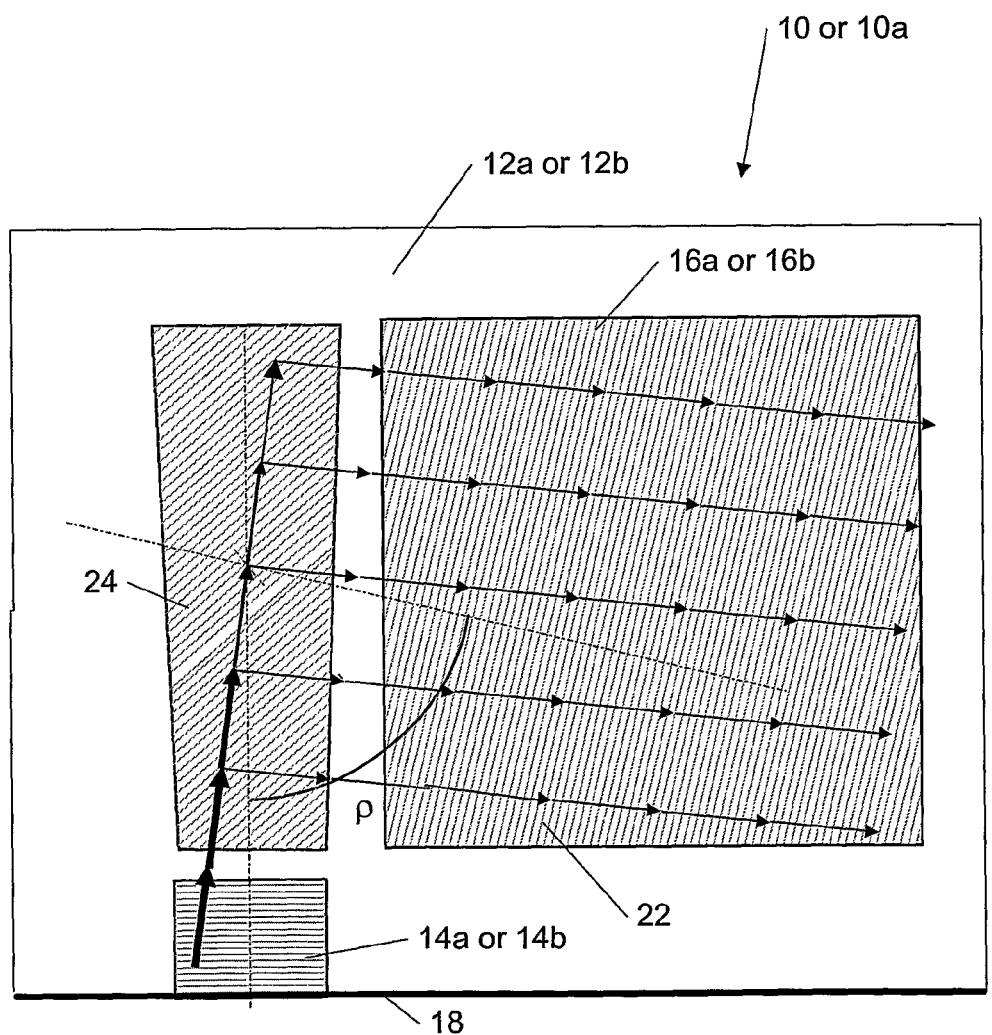
FIGS. 5a and 5b are schematic representations (top views) of one area (out of two) of a two-dimensional diffractive exit pupil expander, wherein an intermediate diffractive element (grating) has an odd number of first order diffractions (shown in FIG. 5a) or an even number of further first order reflections (shown in FIG. 5b), according to an embodiment of the present invention.
Figure 5B:
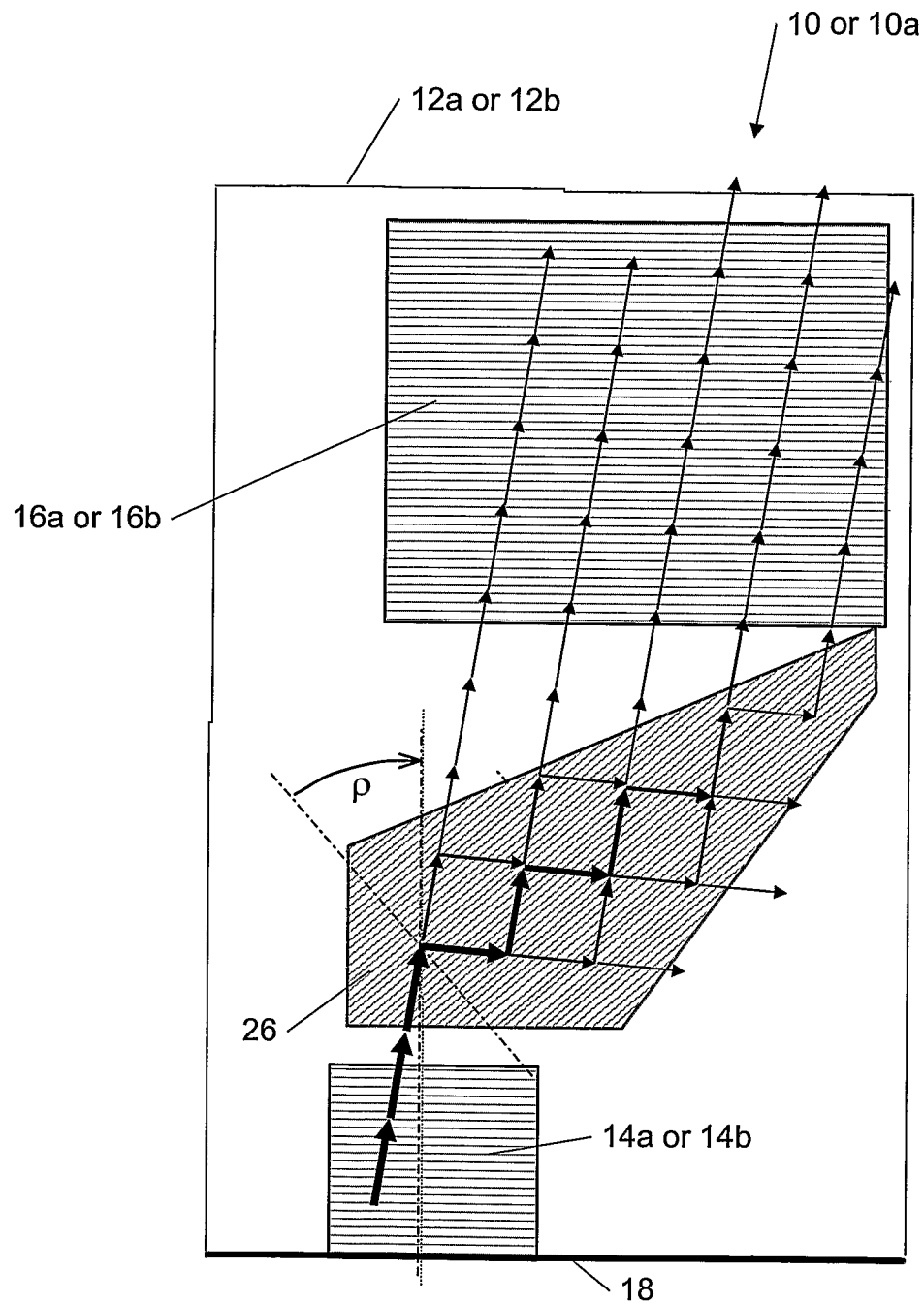

FIGS. 5a and 5b show further examples among others of schematic representations (cross-sectional views) of one area out of two areas 12a or 12b of a two-dimensional diffractive exit pupil expander 12 or 12-1, according to an embodiment of the present invention. An intermediate diffractive element (diffraction grating) 24 or 26 has odd number of first order diffractions (shown in FIG. 4a) or even number of further first order reflections (shown in FIG. 4b) as described by T. Levola in "Diffractive Optics for Virtual Reality Displays", SID Eurodisplay 05, Edinburg (2005), SID 02 Digest, Paper 22.1. The angle ρ is a rotation angle between the periodic lines of the intermediate diffraction grating 26 and the in-coupling grating 14a or 14b.

Figure 6:
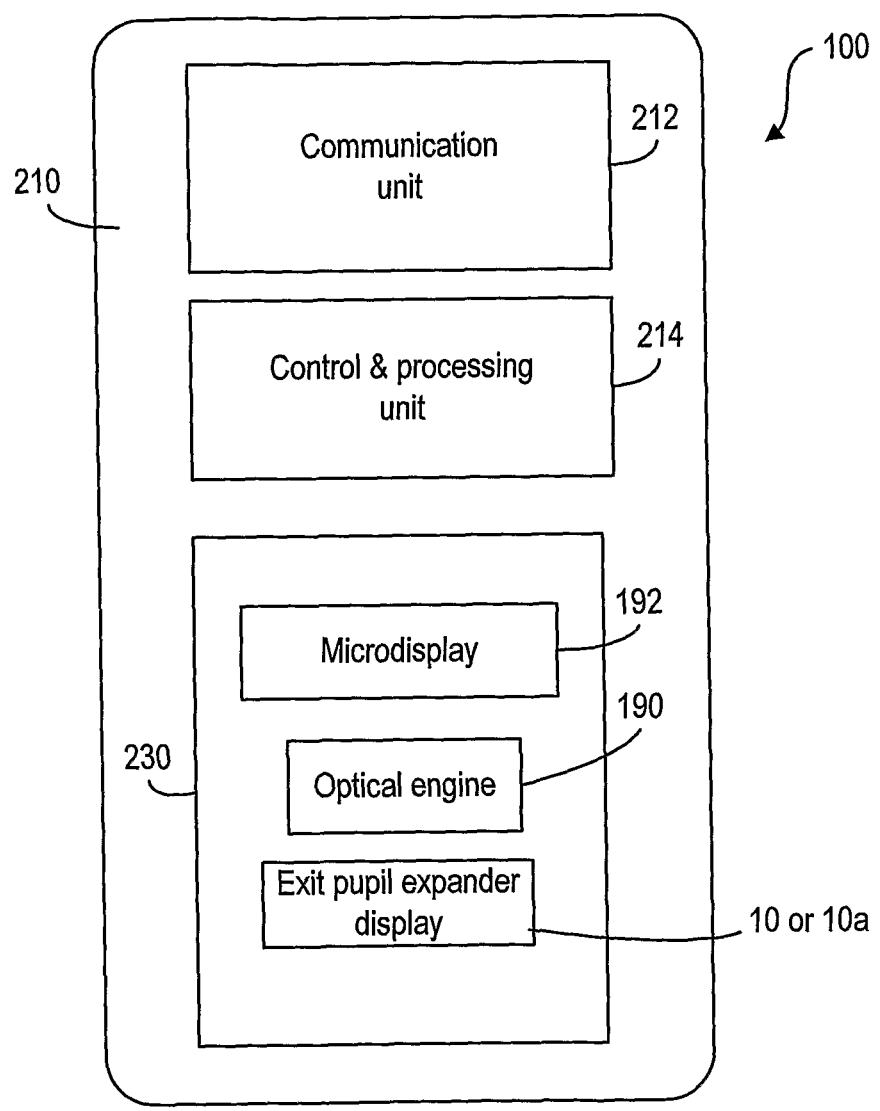
FIG. 6 is a schematic representation of an electronic device, having a stereoscopic display with an exit pupil expander, according to an embodiment of the present invention.

FIG. 6 shows an example of a schematic representation of an electronic device, having a stereoscopic display 10 or 10a with the exit pupil expander (EPE) 12, according to an embodiment of the present invention.

The exit pupil expander (EPE) 12 or 12-1 can be used in an electronic (portable) device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 6, the portable device 100 has a housing 210 to house a communication unit 212 for receiving and transmitting information from and to an external device (not shown). The portable device 100 also has a controlling and processing unit 214 for handling the received and transmitted information, and a virtual display system 230 for viewing. The virtual display system 230 includes a micro-display or an image source 192 and an optical engine 190. The controlling and processing unit 214 is operatively connected to the optical engine 190 to provide image data to the image source 192 to display an image thereon. The EPE device 10 or 10a, according to embodiments of the present invention, can be optically linked to an optical engine 190.

Furthermore, the image source 192, as depicted in FIG. 6, can be a sequential color LCOS (Liquid Crystal On Silicon) device, an OLED (Organic Light Emitting Diode) array, an MEMS (MicroElectro Mechanical System) device or any other suitable micro-display device operating in transmission, reflection or emission.

Moreover, the electronic device 100 can be a portable device, such as a mobile phone, personal digital assistant (PDA), communicator, portable Internet appliance, hand-held computer, digital video and still camera, wearable computer, computer game device, specialized bring-to-the-eye product for viewing and other portable electronic devices. However, the exit pupil expander, according to the present invention, can also be used in a non-portable device, such as a gaming device, vending machine, band-o-matic, and home appliances, such as an oven, microwave oven and other appliances and other non-portable devices.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An apparatus, comprising:
a substrate of optical material having a first surface and a second surface, said substrate comprising a first area and a second area substantially adjacent to each other along a line;
two diffractive elements disposed on the first or the second surface and configured to receive sequentially two input optical beams comprising an optical image of a display such that one of the two input optical beams is received by one of the two diffractive elements and another of the two input optical beams is received by another of the two diffractive elements, wherein one of the two diffractive elements is disposed on the first area and another of the two diffractive elements is disposed on the second area, respectively, wherein said two diffractive elements are substantially next to each other and adjacent to said line;
two further diffractive elements disposed on the first or the second surface, wherein one of the two further diffractive elements is disposed on the first area and another of said two further diffractive elements is disposed on the second area, respectively; and
an optical delivery system, configured to sequentially switch said two input optical beams comprising the optical image of the display between said two diffractive elements; and
wherein the apparatus is configured such that:
at least part of each of the two sequentially switched input optical beams at any time is diffracted only in one of the two diffractive elements to provide a diffracted optical beam in the same area with said one of the two diffractive elements substantially within the first and second surfaces, and
at least part of the diffracted optical beam in the first or the second area is further coupled out of the substrate by diffraction in one of said two further diffractive elements for providing two sequentially switched output optical beams, each comprising the optical image of the display with an expanded exit pupil in one or two dimensions.

2. The apparatus of claim 1, wherein said two sequentially switched output optical beams are for providing a stereoscopic image of the display.

3. The apparatus of claim 1, wherein said optical delivery system comprises two optical sources configured to provide two optical beams in substantially different directions for sequentially switching the two input optical beams.

4. The apparatus of claim 3, wherein said two optical sources are configured to turn on and off in a sequential manner with a predetermined period.

5. The apparatus of claim 3, wherein said optical delivery system comprises a wire grid polarizer configured as a beam-splitter to re-direct the two optical beams for said sequentially switching the two input optical beams between said two diffractive elements and said display is a liquid crystal on silicon display.

6. The apparatus of claim 1, wherein said optical delivery system comprises a shutter configured to sequentially switch the two input optical beams between said two diffractive elements with a predetermined period.

7. The apparatus of claim 1, wherein said substrate is a one-piece substrate.

8. The apparatus of claim 7, wherein an absorbing material is deposited on an end of at least one of the first and the second parts in an area of their physical separation along said line.

9. The apparatus of claim 1, wherein said substrate is configured to have in a vicinity of said line an absorbing material on a surface of the substrate opposite to a substrate surface with the disposed two diffractive elements.

10. The apparatus of claim 1, wherein said substrate is a split substrate such that said first area and second areas are physically separated.

11. The apparatus of claim 1, wherein locations of said two diffractive elements or said two further diffractive elements are symmetrical relative to said line.

12. The apparatus of claim 1, wherein said two diffractive elements have an asymmetric groove shape such that the input optical beam diffracted by each of the two diffractive elements is substantially coupled only to an area, out of the first and the second areas, in which said each of the two diffractive elements is disposed.

13. The apparatus of claim 1, wherein said two diffractive elements have an asymmetric groove shape and are slanted gratings with a slanting angle of more than 20 degrees.

14. The apparatus of claim 1, wherein said two diffractive elements are asymmetric such that their groove shapes are mirror images of each other with respect to the line which separates the first and the second areas.

15. The apparatus of claim 1, wherein said two diffractive elements and said two further diffractive elements are disposed on one surface of said substrate.

16. The apparatus of claim 1, wherein each area, the first and the second area of said substrate, comprises an intermediate diffractive element such that the at least part of the optical beam diffracted in the first or the second diffractive element is first coupled to said intermediate diffractive element, which then couples, using a further diffraction in said intermediate diffractive element, said at least part of said diffracted optical beam to one of said two further diffractive elements disposed on said each area to provide a two-dimensional exit pupil expansion of one of said two input optical beams in said each area.

17. The apparatus of claim 1, wherein the two sequentially switched output optical beams are substantially identical.

18. A method, comprising:
   receiving two sequentially switched input optical beams by two diffractive elements such that one of the two input optical beams is received by one of the two diffractive elements and another of the two input optical beams is received by another of the two diffractive elements, said two diffractive elements being disposed on a first or a second surface of a substrate made of optical material, said substrate comprising a first area and a second area substantially adjacent to each other along a line, wherein said one of the two diffractive elements is disposed on the first part, wherein said two diffractive elements are substantially next to each other and adjacent to said line, wherein said another of the two diffractive elements is disposed on the second part, respectively, wherein said two sequentially switched input optical beams comprise an optical image of a display and are provided by an optical delivery system;
   diffracting at least part of each of the two sequentially switched input optical beams at any time only in one of the two diffractive elements to provide a diffracted optical beam in the same area with said one of the two diffractive elements substantially within the first and second surfaces; and
   coupling at least part of the diffracted optical beam in the first or the second area out of the substrate by diffraction in one of two further diffractive elements for providing two sequentially switched output optical beams, each comprising the optical image of the display with an expanded exit pupil in one or two dimensions,
   wherein the two further diffractive elements are disposed on the first or the second surface, wherein one of the two further diffractive elements is disposed on the first area and another of said two further diffractive elements is disposed on the second area, respectively.

19. The method of claim 18, wherein said two sequentially switched output optical beams are for providing a stereoscopic image of the display.

20. The method of claim 18, wherein said two diffractive elements are substantially next to each other and adjacent to said line.

21. The method of claim 18, wherein said optical delivery system comprises two optical sources configured to provide two optical beams in substantially different directions for sequentially switching the two input optical beams.

22. The method of claim 18, wherein said optical delivery system comprises a shutter configured to sequentially switch the two input optical beams between said two diffractive elements with a predetermined period.

23. The method of claim 18, wherein said substrate is a one-piece substrate.

24. The method of claim 18, wherein said substrate is a split substrate such that said first area and second areas are physically separated.

25. The method of claim 18, wherein said two diffractive elements have an asymmetric groove shape such that the input optical beam diffracted by each of the two diffractive elements is substantially coupled only to an area, out of the first and the second areas, in which said each of the two diffractive elements is disposed.

26. The method of claim 18, wherein said two diffractive elements are asymmetric such that their groove shapes are mirror images of each other with respect to the line which separates the first and the second areas.

27. The method of claim 18, wherein the two sequentially switched output optical beams are substantially identical.

28. An electronic device, comprising:
   a data processing unit;
   an optical engine configured to receive image data from the data processing unit;
   a display device configured to form an image based on the image data; and
   an exit pupil expander device, comprising:
   a substrate of optical material having a first surface and a second surface, said substrate comprising a first area and a second area substantially adjacent to each other along a line;
   two diffractive elements disposed on the first or the second surface and configured to receive sequentially two input optical beams comprising an optical image of a display such that one of the two input optical beams is received by one of the two diffractive elements and another of the two input optical beams is received by another of the two diffractive elements, wherein one of the two diffractive elements is disposed on the first area and another of the two diffractive elements is disposed on the second area, respectively, wherein said two diffractive elements are substantially next to each other and adjacent to said line;
   two further diffractive elements disposed on the first or the second surface, wherein one of the two further diffractive elements is disposed on the first area and another of said two further diffractive elements is disposed on the second area, respectively; and
   an optical delivery system, configured to sequentially switch said two input optical beams comprising the optical image of the display between said two diffractive elements, and
   wherein the electronic device is configured such that:
   at least part of each of the two sequentially switched input optical beams at any time is diffracted only in one of the two diffractive elements to provide a diffracted optical beam in the same area with said one of the two diffractive elements substantially within the first and second surfaces, and at least part of the diffracted optical beam in the first or the second area is further coupled out of the substrate by diffraction in one of said two further diffractive elements for providing two sequentially switched output optical beams, each comprising the optical image of the display with an expanded exit pupil in one or two dimensions.

29. The electronic device of claim 28, wherein said two sequentially switched output optical beams are for providing a stereoscopic image of the display.

30. The electronic device of claim 28, wherein said two diffractive elements are substantially next to each other and adjacent to said line.

31. The electronic device of claim 28, wherein said optical delivery system comprises two optical sources configured to provide two optical beams in substantially different directions for sequentially switching the two input optical beams.

32. The electronic device of claim 28, wherein said substrate is a one-piece substrate.

33. The electronic device of claim 28, wherein said substrate is a split substrate such that said first area and second areas are physically separated.

34. The electronic device of claim 28, wherein the two sequentially switched output optical beams are substantially identical.

* * * * *

UNITED STATES PATENT AND TRADEMARK OFFICE
CERTIFICATE OF CORRECTION

PATENT NO. : 8,466,953 B2  Page 1 of 1
APPLICATION NO. : 12/227728
DATED : June 18, 2013
INVENTOR(S) : Tapani Levola It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this
Eighth Day of September, 2015

Michelle K. Lee
*Director of the United States Patent and Trademark Office*